May 8, 1951
C. A. DE GIERS
2,551,794
TANK GAUGE WITH SINGLE BELLOWS
TEMPERATURE COMPENSATION
Filed July 30, 1948
2 Sheets-Sheet 2
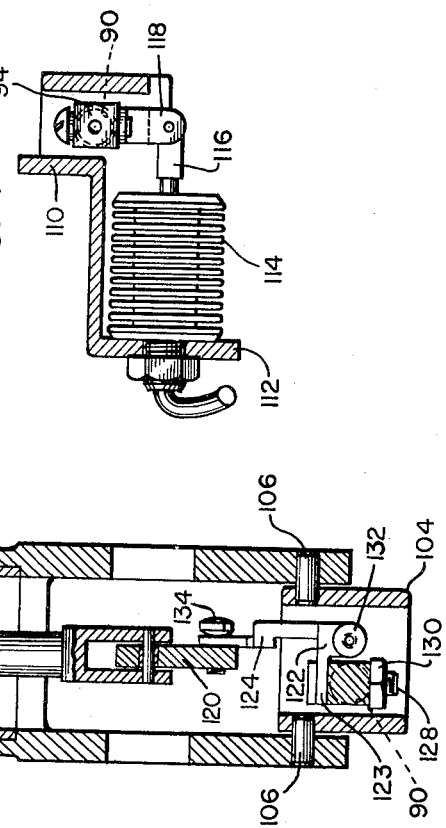
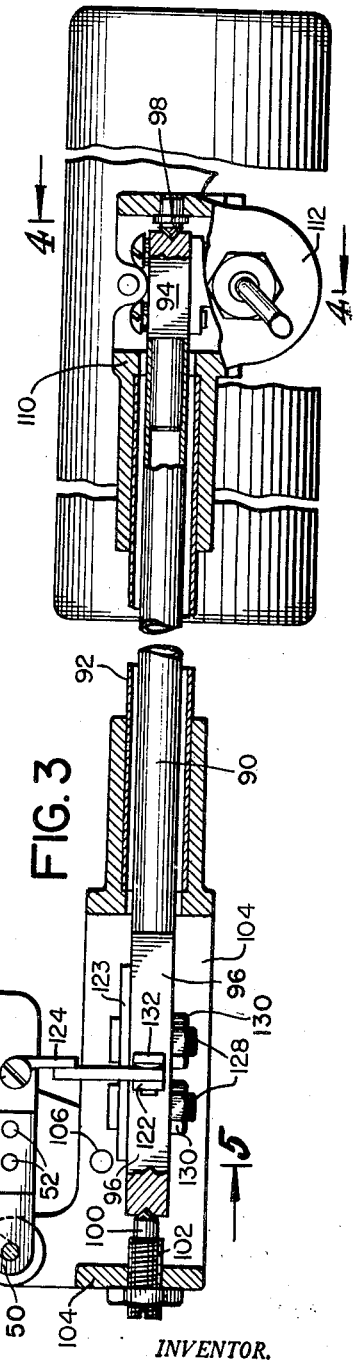
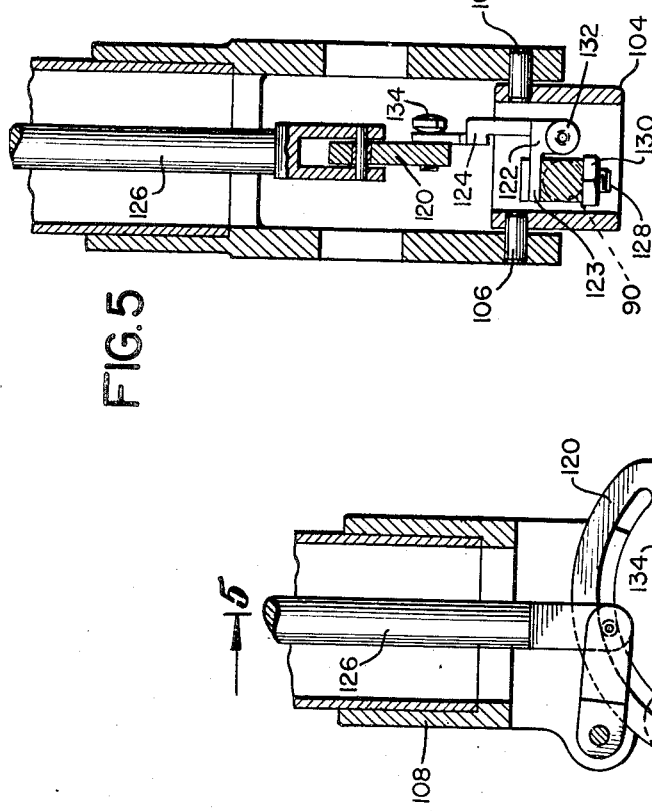
INVENTOR.
CLARENCE A. DEGIERS
BY Robert S. Dunham
ATTORNEY Patented May 8, 1951

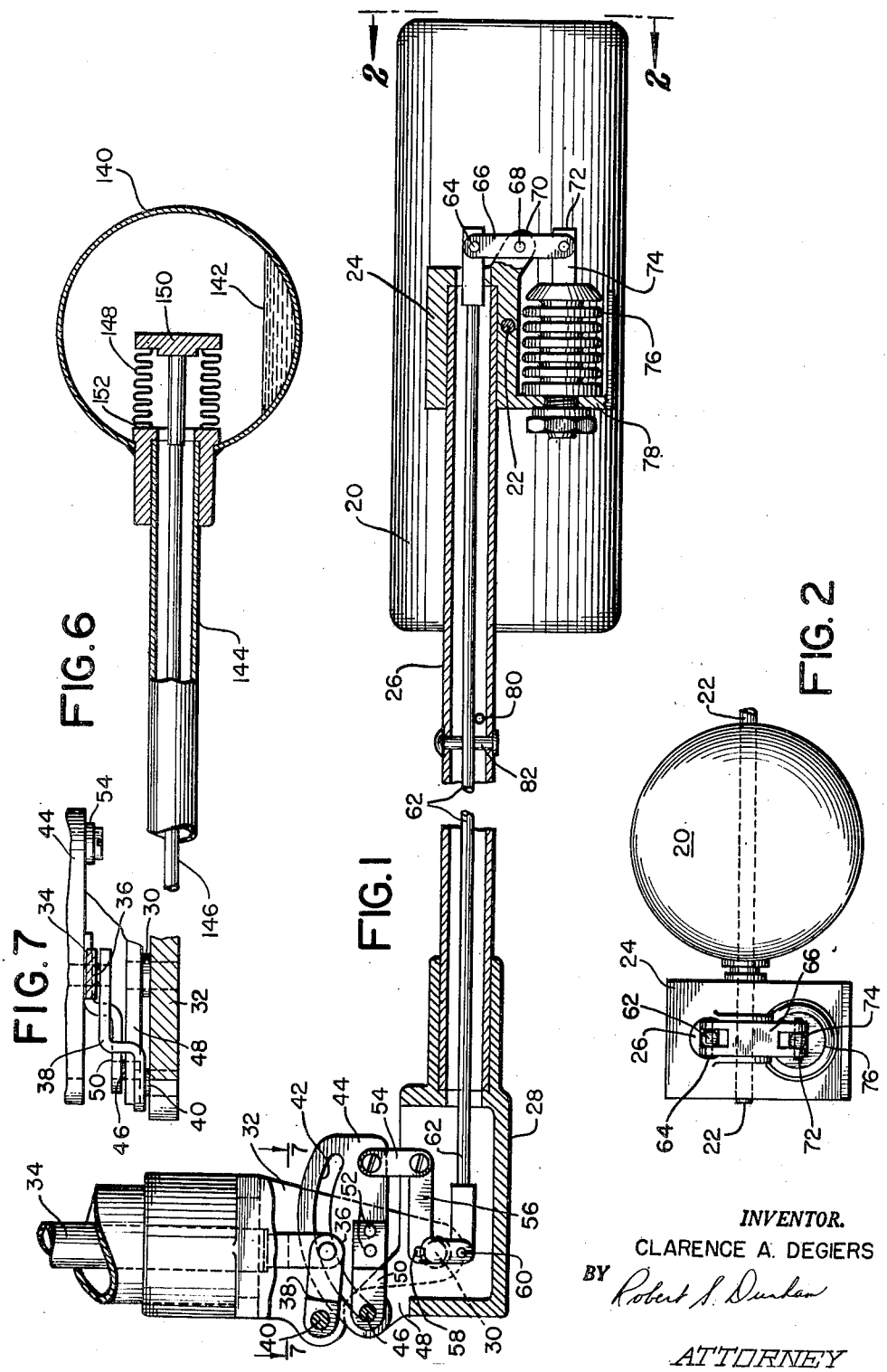

2,551,794

UNITED STATES PATENT OFFICE 2,551,794

TANK GAUGE WITH SINGLE BELLOWS TEMPERATURE COMPENSATION

Clarence A. de Giers, Forest Hills, N. Y., assignor to The Liquidometer Corporation, Long Island City, N. Y., a corporation of Delaware Application July 30, 1948, Serial No. 41,426

4 Claims. (Cl. 73—317)

This invention pertains to a gauge for indicating the liquid contents of a tank by means of a float riding on the liquid in the tank, and an object of the invention is to incorporate in the instrument a thermal element which compensates for differences in temperature of the liquid in order that the gauge may be graduated in units of weight, such as pounds or grams, instead of units of volume, such as gallons or litres.

The usefulness of this invention may readily be understood by considering a gasoline tank in an airplane which is exposed to widely varying temperatures. The gasoline in the tank will expand and contract, and its density will change accordingly. The volume of the liquid might vary widely with the total power energy of the gasoline remaining unchanged. It is therefore desirable to have the tank contents gauge indicate weight instead of volume, because only weight gives a true indication of the available energy in the tank.

The invention automatically applies a temperature correction to the well known float and arm movement, so that the gauge may accurately indicate the tank contents in units of weight.

In summary, the apparatus of the present invention comprises a float adapted to be supported at the surface of a liquid in a tank for operating an indicator (not shown), means operated by the position of the float and hence responsive to the liquid level for actuating the indicator, such means including a cam pivotally mounted on the float arm and having a cam follower arranged to actuate the indicator and means for moving the cam in respect to the float arm to interpose into the mechanical train, including the cam and its follower, between the float and the indicator, a temperature correction for compensating for variations in the level of the liquid incident to expansion and contraction thereof. The particular feature of the present invention resides in the special arrangements of the temperature responsive means in respect to the cam in that the temperature responsive means include an expansible bellows carried by the outer end of the arm and subject to the expansion and contraction of a thermally expansible fluid or the pressure of the vapor thereof which is proportional to such expansion and contraction, and an elongate actuating member extending through the float arm, which is tubular in character, various arrangements being provided by which this elongate actuating member is moved either longitudinally thereof or about its axis as a torsion member to transmit the motion caused by expansion and contraction of the bellows to the inner end of the arm, at which position the motion is transmitted by suitable linkage to the cam. Various arrangements are shown including those in which the elongate actuating member is both longitudinally movable as a push rod and also rotatable as a torsion member. Various arrangements are also shown, in some of which the bellows itself contains the thermally expansible fluid, while in another arrangement this fluid is contained within a hollow float and is permitted to expand and contract and to vaporize to a greater or less extent so as to control the vapor pressure above the fluid within the float. In this form of the invention the bellows is subjected externally to the pressure of the vapor above the liquid. In all cases, however, the fluid is retained within a closed container, either the bellows or the float itself, and is prevented from leakage or direct contact with the liquid in the container.

The present invention is related to copending joint applications of De Giers, the present inventor, and one Arthur Wickesser, Serial Nos. 34,586, 41,488 and 43,828, filed respectively June 23, 1948, July 30, 1948, and August 12, 1948. All these applications are owned in common with the present application.

The lines of division between the present application and the other applications above identified are based on the following principles:

(1) The present application is junior to all the other applications above identified and contains claims readable only on its own disclosure and not readable on the disclosures of any of the other above identified applications.

(2) As between themselves, the other applications have priority in accordance with their respective filing dates.

Further and other objects and advantages will be apparent from the specification and claims, and from the accompanying drawings which illustrate what is now considered the preferred embodiment of the invention.

In the drawings:

Fig. 1 is a view partly in elevation and partly in vertical section, showing indicator actuating mechanism, float-mounted bellows, and push-and-pull means interconnecting the bellows and the indicator actuating mechanism;

Fig. 2 is an end view on line 2—2 of Fig. 1;

Fig. 3 is a view similar to Fig. 1 but with the bellows cross-wise of the float, and with the indicator actuating mechanism controlled through a torsion rod actuated by the bellows;

Fig. 4 is a detail view with parts in vertical section on line 4—4 of Fig. 3;

Fig. 5 is a view substantially in vertical section on line 5—5 of Fig. 3;

Fig. 6 is a detail view principally in vertical section of an embodiment of the invention in which movement of the indicator control rod is obtained by changes in vapor pressure occurring within a hollow float; and Fig. 7 is a fragmentary view taken substantially on the line 7—7 of Fig. 1, showing the construction by which it is possible for the pivots 46 and 36 be in axial alignment with one another at the lowermost or "empty" position of the float; the figure, however, being taken with the parts in the position shown in Fig. 1.

Referring to Figs. 1 and 2, a float 20 of cork is adapted to rest on liquid in a tank. The float is freely mounted on a horizontal pin 22 and therefore remains horizontal on the liquid.

Mounted on pin 22 alongside the float, is a bracket 24 fast on the free end of tubular float arm 26. The other end of the float arm has a bracket 28 by means of which the arm is pivoted at 30 on the lower end of a tubular support 32 extending upwardly to the frame of a tank or container for the liquid, the weight of which is to be indicated. A suitable indicator (not shown) may be used either directly to indicate the weight of liquid in the container in accordance with the movements of the push rods 34 or 126 hereinafter described, or the device mounted on the container could be the transmitter element of a telemetric indicator system in accordance with the teachings contained in applicant's prior Patent No. 2,104,898, issued January 11, 1938. This patent discloses a mechanism which may be directly operated by the rod 34, Fig. 1, or the rod 126, Fig. 3, in a manner which will be obvious from an inspection of the patent. It is further contemplated that the transmitter of applicant's prior Patent No. 2,104,898 aforesaid could be used in a system as disclosed in either of the patents to Lingel, Nos. 2,391,057 and 2,391,058, both issued December 18, 1945.

As the float rises and falls with the liquid in the tank, the indicator is actuated by the vertical rod 34 within support 32. The lower end of rod 34 is guided for vertical movement by a pin 36 in the free end of a link 38 pivoted at 40 on member 32.

The mechanism above described can give correct indications of volume of liquid in the tank. The improvements which enable the device to give correct indications of weight, instead of volume, will now be described.

Pin 36 extends through a curved cam slot 42 in a cam plate 44 which is arranged for pivotal movement about the axis of a pin 46 carried by an arm 48 of bracket 28, which is pivoted at 30 on support 32. A bent plate 50 riveted to cam 44 at 52 is directly pivoted on the pin 46 and thus serves to support the cam plate 44.

The free end of cam 44 is connected by a vertical link 54 to the free end of the horizontal arm of a bell crank 56 pivoted at 58 on bracket 28. The depending, vertical, arm of the bell crank 56 is connected by a pin 60 to a rod 62 extending through tubular float arm 26 and connected at the float end by pin 64 to the upper end of a vertical lever 66 pivoted at 68 on an arm 70 extending from bracket 24. The lower end of lever 66 is pin-connected at 72 to a horizontal stem 74 rigidly carried by the free end of a fluid-filled bellows 76, the fixed end of which is mounted on vertical plate 78, integral with bracket 24. Horizontal and vertical pins 80, 82 in float arm 26 serve to prevent sagging or undue vibration of rod 62.

Fig. 1 shows the positions of elements with the float arm horizontal. When the tank is empty, the float 20 will be at the bottom of the tank with float arm 26 sloping downwardly. For that position, with no liquid in the tank, there can be no error due to liquid expansion or contraction. Therefore, the parts are so designed that when the tank is empty, pivot pin 46 supporting cam 44 is coaxial with pin 36 on the lower end of indicator actuating rod 34 and there is no temperature compensation because rotation of the cam 44 about the then common axis of pins 46 and 36 will cause no vertical movement of rod 34.

Considering now a second position such as when the float arm is level as shown in Fig. 1, if the temperature now decreases, the liquid in the tank will contract, reducing its level, and hence cause the float position to be correspondingly lower. It follows that if no compensation were used, the indicator reading would decrease and give an erroneous indication of the weight of the liquid. However, the decrease in temperature of the liquid in the tank will also cause the thermally expansible fluid in bellows 76 to contract. This contraction, acting through lever 66, rod 62, bell crank 56 and link 54, will move cam 44 upwardly (counterclockwise, Fig. 1) around its pivot 46, thus causing a slight upward movement of push rod 34. Therefore it will be clear that a lowering of the push rod 34 due to the lower position of the float (resulting from contraction of the fuel volume due to lower temperature) is neutralized by a corresponding lift of the push rod due to the action of cam 44 (resulting from temperature response of bellows 76). Therefore the weight reading of the indicator will be correct.

By way of comparison with conditions when the float was at the bottom of the tank, it will be noticed that, under conditions just described, pivot pins 46 and 36 are no longer coaxially positioned, but are separated by a section of the arc of the slot 42 in the cam. Any rotation of cam element 44 about pivot pin 46 due to temperature change of bellows 76 will bring about a vertical displacement of pin 36 and hence of push rod 34. This action will be zero for an empty tank and gradually increase to a maximum for a full tank.

It will also be apparent that the shape of cam slot 42 can be designed to compensate for irregularly shaped tanks.

In the modification of Figs. 3, 4 and 5 the operation is the same as above described except that push-pull rod 62 is replaced by a tubular torsion rod 90 extending through the tubular float arm 92. Torsion rod 90 has non-tubular end pieces 94 and 96 and is supported for rotation on conical bearings 98 and 100, the latter being adjustable by screw 102. The float arm 92 has secured thereto at its left end as seen in Fig. 3 a bracket 104, by means of which the arm is pivoted at 106 on the lower end of the tubular support 108, which extends upwardly and is suitably secured at the top of the tank for example to the frame of an indicator (not shown).

The outer end of arm 92 is provided with a bracket 110 secured thereto (Figs. 3 and 4) and having a downwardly extending vertical plate 112, on which is mounted a horizontal bellows 114, fluid-filled, and therefore responding to temperature changes of the tank contents, exactly as bellows 76 described above. Bellows 114 has a horizontal stem 116 pivotally connected to the lower end of an arm 118 depending from end piece 95 of torsion rod 90.

When the temperature of the liquid in the tank changes, bellows 114 expands or contracts substantially axially, rotating rod 90 and raising or lowering cam 120 accordingly through the instrumentality of crank arm 122 carried by the end piece 96 and push-pull member or link 124. Cam 120 functions in the same manner as cam 44 above described, and adjusts the position of indicator actuating rod 126 in the same manner as rod 34 of Fig. 1 was adjusted, and for the same purpose.

Crank arm 122 as illustrated is formed of metal as a bent frame plate 123, and is clamped to end piece 96 by bolts 128 and nuts 130. Member or link 124 is attached to crank arm 122 by screw 132 and to cam 120 by screw 134. The contact surfaces of the heads of screws 132 and 134 are arcuate to permit the necessary lost motion of link 124.

Fig. 6 shows another arrangement, in which control is obtained by utilizing the pressure of gas from a volatile liquid in a hollow float to control the indicator. The pressure of the gas varies with temperature of the tank liquid and causes a bellows to shorten and lengthen accordingly.

In the drawing, 140 is the float containing volatile liquid 142. The float is mounted on the end of tubular float arm 144, and within the float arm is a push-pull rod 146 corresponding to the rod 62, Fig. 1, and with one end passing through a bellows 148 and attached to the inner side of the freely movable head 150 of the bellows, which is sealed at 152 from the gaseous and liquid float contents. As the vapor pressure in the float varies with temperature, bellows 148 expands or contracts lengthwise, thus moving rod 146 and thereby moving a cam as in Fig. 1 in order to permit the indicator to be graduated in units of weight, instead of units of volume.

It is to be understood that the invention is not limited to the specific embodiments herein illustrated and described but may be used in other ways without departure from its spirit as defined by the following claims.

I claim:

1. Apparatus for indicating the liquid contents of a container in units of weight, comprising a float arranged to float on the liquid in the container, a hollow tubular arm carrying said float adjacent to its outer end, means pivotally supporting an inner end portion of said arm for movement about a predetermined, substantially horizontal axis fixed in respect to said container, and means including a mechanical train actuated by the position of said arm for operating an indicator for indicating the liquid contents of the container in units of weight; said mechanical train including a cam element pivoted to a point on said arm eccentric of but adjacent to said axis, said cam element having an actuating cam surface formed thereon, a cam follower engaging said cam surface and forming a part of said mechanical train for actuating the indicator, the parts aforesaid being constructed and arranged so that movement of said arm in response to a change in the level of the liquid in said container acts to control the indication given by the indicator, means including an expansible bellows carried by the outer end of said arm and having one end fixed in respect to said arm and subject to the expansion and contraction of a thermally expansible fluid which is subject to the temperature of the liquid in the container but is maintained separated therefrom, and mechanical means including an elongate actuating member extending through said hollow tubular arm for transmitting motion from the free end of said bellows to said cam for moving said cam in respect to said arm, so as to interpose a temperature correction into said mechanical train, so that the indicator may be calibrated in units of weight and give accurate indications thereof independently of variations in the volume of the liquid in the container resulting from changes in its temperature.

2. Apparatus in accordance with claim 1, wherein said bellows contains the thermally expansible fluid and is expanded and contracted by the expansion and contraction of said fluid, said bellows being mounted on the outer end of and below said arm adjacent to said float, so that the fluid therein is subject to the temperature of the liquid in said container, and wherein said elongate actuating member is a push rod extending substantially co-axially through said hollow tubular arm and movable axially thereof in response to the expansion and contraction of said bellows, means articulating the free end of said bellows to one end of said push rod, and means articulating the other end of said push rod to said cam.

3. Apparatus in accordance with claim 1, wherein said bellows is fixed to the outer end of said arm with its axis arranged transverse thereof, wherein the thermally expansible fluid is contained within said bellows, so that expansion and contraction of said bellows is caused by expansion and contraction of said fluid respectively, wherein said elongate actuating member is a tortion member located within said arm and mounted for rotational movement about the longitudinal axis of said arm, means including a crank arm connecting the free end of said bellows to said tortion member, so that said tortion member is rotated in response to the expansion and contraction of said bellows, and means including a crank arm, a link and lost motion connections articulating the inner end of said tortion member adjacent to the inner end of said arm to said cam, so that rotation of said tortion member is effective to move said cam in respect to said arm.

4. Apparatus in accordance with claim 1, wherein said float is hollow and is fixed to the outer end of said arm, wherein the thermally expansible fluid is contained within said hollow float, said fluid being of a character such as to be volatile with the vapor pressure above a liquid phase portion of the fluid proportional to the temperature of said liquid in the container, wherein said bellows is disposed inside said float and is externally exposed to the vapor pressure of said fluid within said float, so that said bellows will be expanded and contracted as said fluid is exposed to lesser and greater temperatures of said liquid respectively, wherein said elongate actuating member is directly connected at its outer end to the free end of said bellows and is actuated thereby to move in a direction axial of said hollow arm, and means articulating the inner end of said elongate actuating member to said cam.

CLARENCE A. DE GIERS.

REFERENCES CITED

The following references are of record in the file of this patent:

UNITED STATES PATENTS

| Number | Name | Date |
|---|---|---|
| Re. 18,514 | Reeves | July 5, 1932 |
| 1,772,929 | De Giers | Aug. 12, 1930 |
| 1,791,489 | De Giers | Feb. 10, 1931 |
| 2,369,027 | De Giers | Feb. 6, 1945 |